(12) United States Patent
Frait et al.

(10) Patent No.: US 9,157,495 B2
(45) Date of Patent: Oct. 13, 2015

(54) TORQUE CONVERTER HAVING INTEGRATED FLEX PLATE FOR HYBRID ELECTRIC VEHICLE

(71) Applicant: FORD GLOBAL TECHNOLOGIES, LLC, Dearborn, MI (US)

(72) Inventors: Steven A. Frait, Milan, MI (US); John E. Brevick, Livonia, MI (US); Keith A. Devereaux, Roseville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 96 days.

(21) Appl. No.: 14/062,184

(22) Filed: Oct. 24, 2013

(65) Prior Publication Data

US 2015/0114779 A1    Apr. 30, 2015

(51) Int. Cl.
*B60K 6/40* (2007.10)
*F16H 45/00* (2006.01)
*F16D 47/06* (2006.01)

(52) U.S. Cl.
CPC . *F16D 47/06* (2013.01); *B60K 6/40* (2013.01); *F16H 2045/002* (2013.01); *Y10S 903/951* (2013.01)

(58) Field of Classification Search
None
See application file for complete search history.

(56) References Cited

U.S. PATENT DOCUMENTS

| | | | |
|---|---|---|---|
| 2003/0057004 A1* | 3/2003 | Morishita et al. | 180/65.2 |
| 2005/0155831 A1* | 7/2005 | Masuya | 192/3.3 |
| 2013/0192949 A1* | 8/2013 | Frait et al. | 192/85.63 |
| 2013/0193816 A1* | 8/2013 | Iwase et al. | 310/75 R |

FOREIGN PATENT DOCUMENTS

JP    2006-137406 A  *  6/2006

* cited by examiner

*Primary Examiner* — Richard Lorence
(74) *Attorney, Agent, or Firm* — David B. Kelley; MacMillan, Sobanski & Todd, LLC

(57) ABSTRACT

An assembly includes a torque converter concentric with an axis, a rotor hub drivably connected for rotation about the axis to an electric machine and selectively to an engine through a disconnect clutch, a coupler located between the rotor hub and torque converter, providing a rotational connection and an axial connection between the coupler and the rotor hub, and a flex plate providing second rotational and axial connections between the coupler and the torque converter.

14 Claims, 4 Drawing Sheets

TORQUE CONVERTER HAVING INTEGRATED FLEX PLATE FOR HYBRID ELECTRIC VEHICLE

BACKGROUND OF THE INVENTION

1. Field of the Invention

This invention relates to a powertrain for hybrid electric vehicles, particularly to a powertrain module that is located between and secured to an engine output and a transmission input.

2. Description of the Prior Art

Hybrid electric vehicles (HEVs) have both an internal combustion engine and an electric machine, which are alternately, or in combination, used to propel the vehicle. A variety of different powertrains are used in hybrid vehicles such as a parallel configuration, in which the engine is connected to the motor by a disconnect clutch with the motor driving a torque converter input of an automatic power transmission. The transmission has an output which is connected to a differential coupled to the two driven wheels of the vehicle.

A need exists in the industry for a hybrid electric powertrain that includes a modular subassembly for use with a variety of engines and transmissions, such that the module can be installed between and secured to an output of one of a number of engines and to an input of one of a number of transmissions. The assembled powertrain may then be employed in a variety of vehicles. The module should include a hydraulically actuated disconnect clutch, the electric machine and suitable power paths between the engine and electric machine to the transmission input. Preferably, the module provides for hydraulic communication from the transmission's hydraulic system to the clutch, a balance dam and the electric machine. The module must provide an oil sump containing hydraulic fluid delivered to the module, and a path for continually returning that fluid to the transmission's oil sump so that the transmission pump is continually supplied reliably with fluid.

This module is sometimes called a front module (FM), since it is part of the modular hybrid transmission (MHT) and is bolted in front of the transmission. Since this module adds length to the powertrain, the module should be as short as possible. The attachment between the flex plate on the FM and the torque converter does not provide access, which torque converters normally have to engine flex plates resulting in added length to the powertrain.

SUMMARY OF THE INVENTION

An assembly includes a torque converter concentric with an axis, a rotor hub drivably connected for rotation about the axis to an electric machine and selectively to an engine through a disconnect clutch, a coupler located between the rotor hub and torque converter, providing a rotational connection and an axial connection between the coupler and the rotor hub, and a flex plate providing second rotational and axial connections between the coupler and the torque converter.

The assembly is axially short and allows easy installation of the front module to transmission, providing an attachment method without increasing the axial dimension of the powertrain.

The flex plate is integrated with the front of the torque converter. The assembly does not require the conventional flex plate attachment bolts or nuts, but allows the torque converter to elastically expand and contract without risk of damage to the transmission pump.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1A:
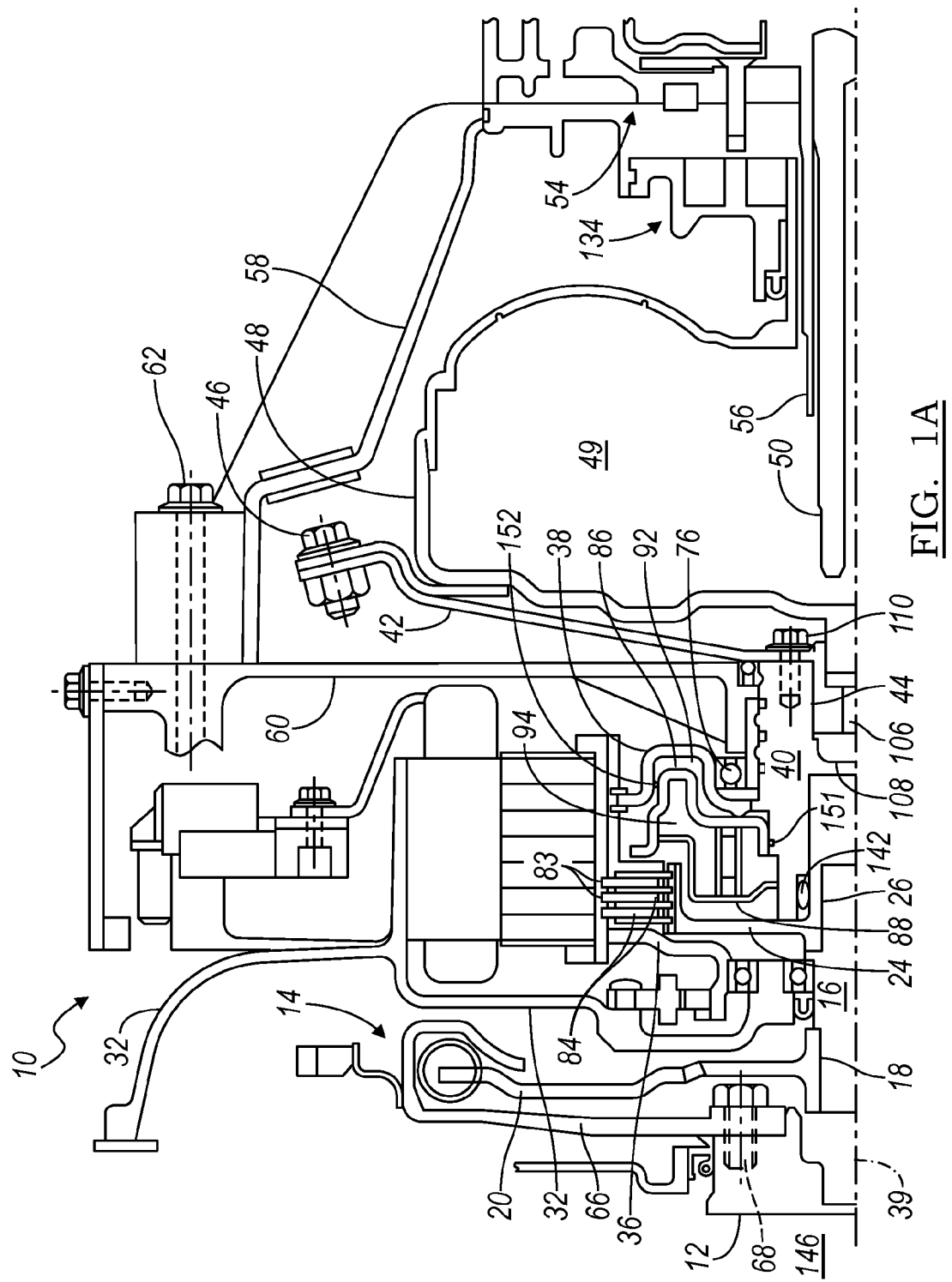
FIGS. 1A and 1B comprise a side cross-sectional view of a powertrain module showing a front connection to an engine output and a rear connection to a transmission torque converter input.
Figure 1B:
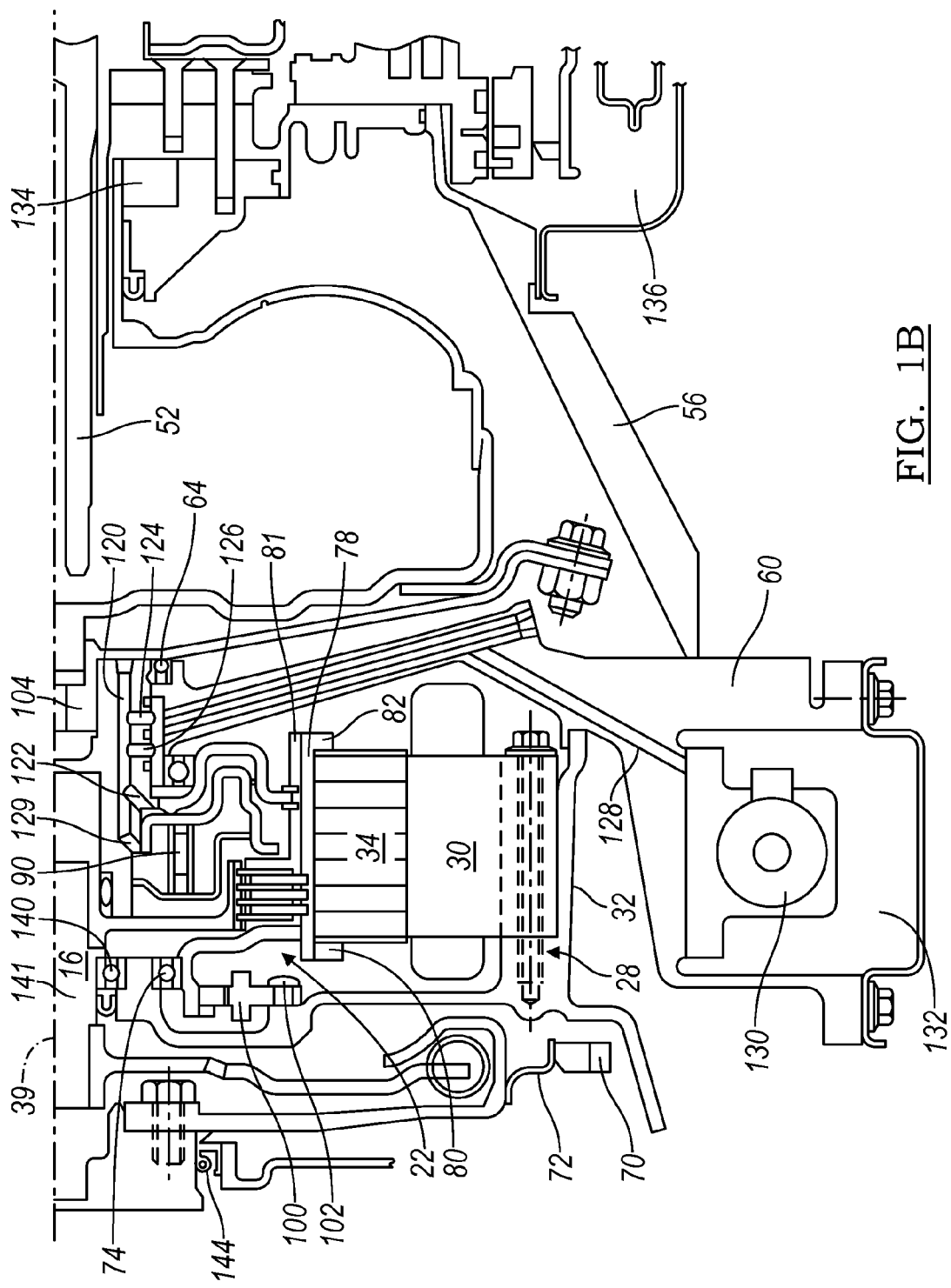

FIGS. 1A and 1B illustrate a module 10 of a powertrain for a hybrid electric vehicle that includes an engine having a rotary output 12; a torsional damper 14, secured to the engine output 12; an input shaft 16, secured by a spline 18 to an output 20 of damper 14; a disconnect clutch 22, supported on a clutch hub 24 that is secured by a spline 26 to input shaft 16; an electric machine 28, which includes a stator 30 bolted to a front bulkhead 32 and a rotor 34 supported by a first leg 36 and a second leg 38 for rotation about an axis 39; a rotor hub 40, secured preferably by a weld to leg 38; and a flexplate 42, secured at one end by a spline connection 44 or by bolts 110 to rotor hub 40 and secured at the opposite end by bolts 46 to a torque converter casing 48, which encloses a hydrokinetic torque converter 49. The electric machine 28 may be an electric motor or an electric motor-generator.

Torque converters suitable for use in the powertrain are disclosed in and described with reference to FIGS. 4a, 4b, 5, 12 and 15 of U.S. patent application Ser. No. 13/325,101, filed Dec. 14, 2011, the entire disclosure of which is herein incorporated by reference.

The torque converter 49 includes a bladed impeller wheel located within and secured to casing 48; a bladed turbine, driven hydrokinetically by the impeller and secured by a spline 50 to the input shaft 52 of an automatic transmission 54; and a bladed stator wheel, located between the turbine and stator and secured to a stator shaft 56, which is held against rotation on a transmission housing 58.

A rear bulkhead 60, secured by bolts 62 to the transmission housing 58, is fitted at its radial inner surface with a hydraulic seal 64, which contacts the radial outer surface of rotor hub 40.

A flywheel 66, secured by bolts 68 to the engine's rotary output 12, carries an engine starting gear 70, which is secured by a disc 72, welded to the starting gear and flywheel.

A bearing 74 supports the first leg 36 for rotation on the front bulkhead 32. A bearing 76 supports the second leg 38 for rotation on the rotor hub 40. A tube 78, aligned with axis 39 and supporting the rotor 34 for rotation about the axis, is secured to the first leg 36 and second leg 38. Lips 80, 82 at the front and rear ends, respectively, of tube 78 may be rolled radially outward to secure the rotor 34 to tube 78 and to prevent axial displacement of the rotor 34 relative to the tube. The inner surface of tube 78 is formed with an axial spline 81, which is engaged by the legs 36, 38 and alternate plates 83 of the disconnect clutch 22. The friction plates 84 of clutch 22 are secured by an axial spline formed on the radial outer surface of clutch hub 24.

A hydraulic servo for actuating clutch 22 includes a piston 86, balance dam 88, return spring 90 and hydraulic lines for transmitting actuating pressure to the pressure control volume 92 at the right hand side of piston 86 and to the pressure balance volume 94 at the left hand side of the piston. Piston 86 moves leftward in a cylinder formed by the rear leg 38 when actuating pressure and hydraulic fluid is supplied to volume 92, by the use of seals 151 and 152, thereby causing clutch 22 to engage and driveably connect rotor 34 and the engine output 12 through damper 14, input shaft 16, clutch hub 24 and clutch 22.

Because the piston 86, balance dam 88 and return spring 90 are supported on the rotor hub 40, rotational inertia of the piston 86, balance dam 88 and return spring 90 is located on the output side, i.e., the rotor side of clutch 22.

Rotor 34 is continually driveably connected to the transmission input shaft 52 through the torque path that includes rear leg 38, rotor hub 40, flexplate 42, torque converter casing 48, the hydrodynamic drive connection between the torque converter impeller and turbine, which is connected by spline 50 to transmission input shaft 52.

A resolver 100, a highly accurate type of rotary electrical transformer used for measuring degrees of rotation, is secured by bolts 102 to the front bulkhead 32, is supported on the front bulkhead 32 and first leg, and is located axially between the front bulkhead 32 and rear bulkhead 60.

The teeth of spline 44, which produces a rotary drive connection between flexplate 42 and rotor hub 40, are fitted together such that no lash is produced when torque is transmitted between the flexplate and rotor hub. Flexplate 42 is formed with a thick walled portion 104 having a threaded hole 106 that terminate at a web 108. The external spline teeth on flexplate 42 are forced axially into engagement with the internal spline teeth on rotor hub 40 by bolts 110, which engage threaded holes in the right-hand end of rotor hub 40. The engaged spline teeth at the spline connection 44 are disengaged upon removing bolts 110 and threading a larger bolt into hole 106 such that the bolt contacts web, thereby forcing flexplate axial rightward.

Rotor hub 40 is formed with multiple axially-directed hydraulic passages 120 and laterally-directed passages 122, 124, 126, 128, 129, which carry hydraulic fluid and pressure to module 10 from the hydraulic system of the transmission 54. Passages 122, 124, 126, 128, 129 carry hydraulic fluid and pressure which includes to the control volume 92 of the servo of clutch 22 located at the right hand side of piston 86, to the pressure balance volume 94 between balance dam 88 and the piston, to a variable force solenoid (VFS) 130, and to the surfaces of rotor 34 and stator 30, which surfaces are cooled by the fluid. The rear bulkhead 60 is formed with passage 128, which communicates hydraulically with VFS 130.

The rear bulkhead 60 supports a sump 132, which contains fluid supplied to module 10 from the hydraulic system of the transmission 54. Transmission 54 includes a sump 136, which contains hydraulic fluid that is supplied by a transmission pump 134 to the transmission hydraulic system, from which fluid and control pressure is supplied to module 10, torque converter 49, transmission clutches and brakes, bearings, shafts, gears, etc.

A bearing 140, fitted in the front bulkhead 32, and a bearing 142, fitted in the rotor hub 40, support input shaft 16 in rotation about axis 39. The front bulkhead 32 also supports the stator 30 in its proper axial and radial positions relative to the rotor 34. Bearing 76, fitted between rear bulkhead 60 and rotor hub 40, and bearing 142 support rotor hub 40 in rotation about axis 39. The front and rear bulkheads 32, 60 together support rotor 34 in rotation about axis 39 due to bearing 74, fitted in bulkhead 32, and bearing 76, fitted in bulkhead 60.

Seal 64, fitted in the rear bulkhead 60, and seal 141, fitted in the front bulkhead 32, prevent passage of fluid from module 10 located between the bulkheads 32, 60. Another dynamic seal 144 prevents passage of contaminants between the engine crankshaft 146 and module 10.

The components of module 10 are installed and assembled in the module. The assembled module can then be installed between and connected to the engine output 12 and the torque converter casing 48.

In operation, when the engine output 12 is driven by an engine, torque is transmitted from the engine through rotor hub 40 and flexplate 42 to the torque converter casing 48, provided that clutch 22 is engaged. The rotor 34 electric machine 28 is continually driveably connected through tube 78, leg 38, rotor hub 40 and flexplate 42 to the torque converter casing 48. Therefore, the torque converter casing 48 can be driven by the engine alone, provided the electric machine 28 is off and clutch 22 is engaged; by the electric machine alone, provided the engine is off or the engine is operating and the clutch is disengaged; and by both the engine and electric machine concurrently.

Figure 2:
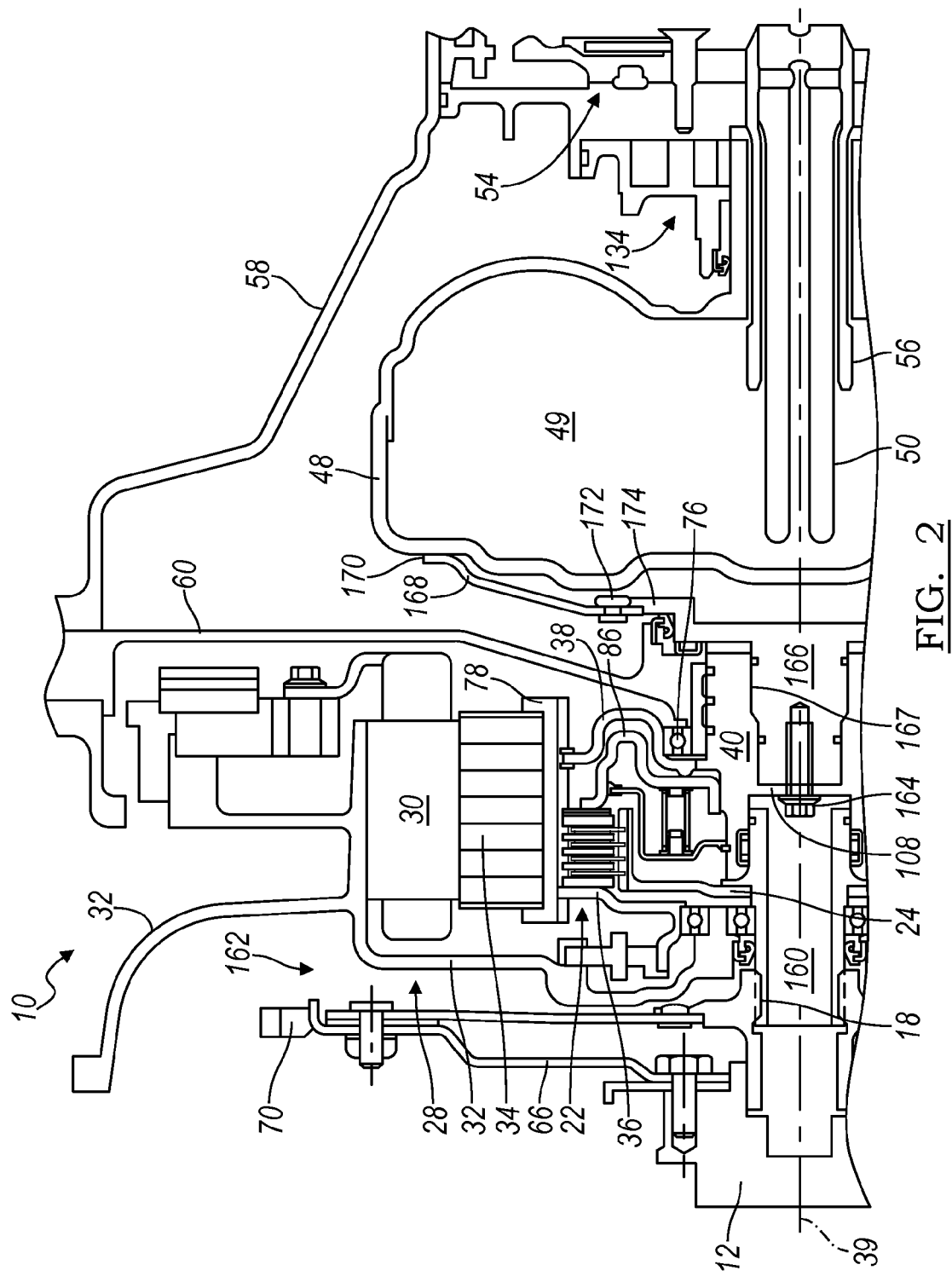
FIG. 2 is side cross-sectional view of the powertrain of FIG. 1 showing a torque converter having a bolted, integrated flex plate.

In FIG. 2, input shaft 160 is driveably connected to the engine output 12 through flywheel 66, flexplate 162 and spline 18. A bolt 164, installed through the front side of the front module, is inserted through a bore in input shaft 160 and through a web 108 of rotor hub 40. Bolt 164 is threaded into a tapped bore formed at the front side of a coupler shaft 166, thereby providing axial force continuity between rotor hub 40 and coupler shaft 166. Coupler shaft 166 is connected for rotation with rotor hub 40 through a spline connection 167, which includes mutually engaged axial spline teeth formed on an inner radial surface of rotor hub 40 and axial spline teeth formed on the external radial surface of coupler shaft 166.

A flex plate 168 is secured, preferably by a weld 170, to the torque converter casing 48 and by a series of rivets 172 to a flange 174 of coupler shaft 166, thereby securing rotor hub 40 to torque converter casing 48. Bolt 164 secures torque converter 49 to the front module 10 and carries axial load between the torque converter 49 and module 10.

Figure 3:
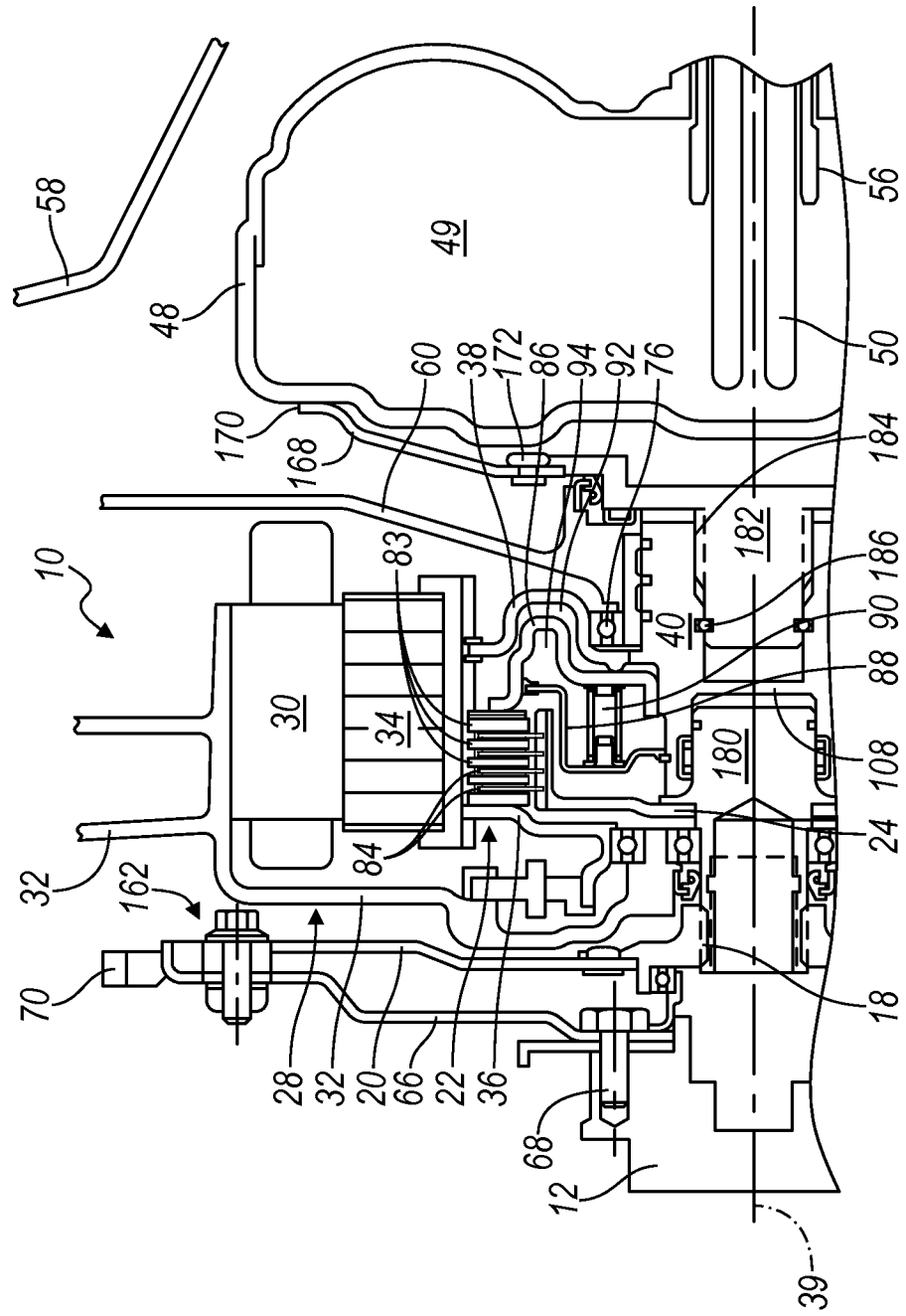
FIG. 3 is side cross-sectional view of the powertrain of FIG. 1 showing a torque converter having an elastically coupled integrated flex plate.

In FIG. 3, input shaft 180 is driveably connected to the engine output 12 through flywheel 66, flexplate 162 and spline 18. A flex plate 168 is secured, preferably by a weld 170, to the torque converter casing 48 and by a series of rivets 172 to a flange 174 of coupler shaft 182, thereby securing rotor hub 40 to torque converter casing 48.

Coupler shaft 182 is connected for rotation to rotor hub 40 through a spline connection 184, which includes mutually engaged axial spline teeth formed on an inner radial surface of rotor hub 40 and axial spline teeth formed on the external radial surface of coupler shaft 182.

Rotor hub 40 is formed with an annular recess located at a radial inner surface of a bore in the rotor hub. Similarly, coupler shaft 182 is formed with an annular recess located at a radial outer surface and aligned axially with a recess of rotor hub 40. A C-clip 186 mutually engages the recess of rotor hub 40 and coupler shaft 182, thereby securing torque converter 49 to the front module 10 and carrying axial load between the torque converter 49 and module 10.

The alternate assembly techniques of FIGS. 2 and 3 provide an attachment technique that does not increase the length of the powertrain. The option of FIG. 3 allows service of the transmission and torque converter without removal of module 10 from the vehicle . . . .

In accordance with the provisions of the patent statutes, the preferred embodiment has been described. However, it should be noted that the alternate embodiments can be practiced otherwise than as specifically illustrated and described.

The invention claimed is:

1. An assembly, comprising:
   a torque converter concentric with an axis;
   a rotor hub drivably connected for rotation about the axis to an electric machine and selectively to an engine through a disconnect clutch;
   a coupler located between the rotor hub and torque converter, providing a rotational connection and an axial connection between the coupler and the rotor hub;
   a flex plate providing second rotational and axial connections between the coupler and the torque converter; and
   wherein the axial connection includes a first recess located at a radial inner surface of a bore in the rotor hub, a second recess located at a radial outer surface of the coupler and aligned axially with the first recess, and a connector mutually engaged with the first and second recesses for transmitting axial force between the rotor hub and the coupler.

2. The assembly of claim 1, wherein the rotational connection includes mutually engaged axial spline teeth formed on an inner radial surface of the rotor hub and axial spline teeth formed on an external radial surface of the coupler.

3. The assembly of claim 1, wherein the connector is a c-clip located in the first and second recesses and elastically, releasably connecting the rotor hub and the coupler.

4. The assembly of claim 1, wherein the flex plate includes:
   a disc extending radially and axially from a radial inner connection between the disc and the coupler to a radial outer connection between the disc and a casing of the torque converter.

5. The assembly of claim 4, wherein the radial inner connection comprises a series of second connectors, and the radial outer connection is a weld.

6. The assembly of claim 4, wherein the radial inner connection comprises a series of rivets.

7. An assembly, comprising:
   a clutch alternately opening and closing a drive connection between an engine and a rotor of an electric machine;
   a rotor hub rotatably connected to the rotor for rotation about an axis;
   a torque converter;
   a coupler providing a rotational connection and an axial connection between the coupler and the rotor hub;
   a flex plate providing second rotational and axial connections between the coupler and the torque converter; and
   wherein the axial connection includes a first recess located at a radial inner surface of a bore in the rotor hub, a second recess located at a radial outer surface of the coupler and aligned axially with the first recess, and a connector mutually engaged with the first and second recesses for transmitting axial force between the rotor hub and the coupler.

8. The assembly of claim 7, wherein the rotational connection includes mutually engaged axial spline teeth formed on an inner radial surface of the rotor hub and axial spline teeth formed on an external radial surface of the coupler.

9. The assembly of claim 7, wherein the connector is a c-clip located in the first and second recesses and elastically, releasably connecting the rotor hub and the coupler.

10. The assembly of claim 7, wherein the flex plate includes:
    a disc extending radially and axially from a radial inner connection between the disc and the coupler to a radial outer connection between the disc and a casing of the torque converter.

11. The assembly of claim 10, wherein the radial inner connection comprises a series of second connectors, and the radial outer connection is a weld.

12. The assembly of claim 10, wherein the radial inner connection comprises a series of rivets.

13. An assembly, comprising:
    a torque converter;
    a rotor hub driveably connected to a motor and selectively connected to an engine;
    a coupler providing rotational and axial connections between the rotor hub and torque converter, the axial connection including a recess in a rotor hub bore, a second recess in a coupler outer surface, and a connector engaging the recesses to transmit axial force;
    a flex plate connecting the coupler to the torque converter.

14. The assembly of claim 13, wherein the connector is a C-clip located in the recesses and elastically, releasably connecting the rotor hub and the coupler.

* * * * *